(12) United States Patent
Bowers et al.

(10) Patent No.: US 8,657,316 B1
(45) Date of Patent: Feb. 25, 2014

(54) REAR AXLE SUPPORT ASSEMBLY

(71) Applicant: Honda Motor Co., Ltd., Tokyo (JP)

(72) Inventors: Lee N. Bowers, Springfield, OH (US); Jason A. Sovern, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/803,259

(22) Filed: Mar. 14, 2013

(51) Int. Cl.
*B60G 9/02* (2006.01)
*B60G 21/05* (2006.01)
*B60K 17/16* (2006.01)

(52) U.S. Cl.
USPC .............. 280/124.156; 280/124.11; 180/352; 180/354; 180/355; 180/356; 180/358; 180/360; 180/361; 180/363; 74/607

(58) Field of Classification Search
USPC ........... 280/124.156, 124.11, 124.1; 180/348, 180/349, 350, 352, 353, 354, 355, 356, 358, 180/359, 360, 361, 363, 215, 233; 74/607
See application file for complete search history.

(56) References Cited

U.S. PATENT DOCUMENTS

| 4,646,865 | A | * | 3/1987 | Imaizumi et al. | 180/349 |
|---|---|---|---|---|---|
| 4,730,689 | A | | 3/1988 | Takahashi et al. | |
| 4,860,850 | A | * | 8/1989 | Takahashi | 180/215 |
| 4,999,003 | A | * | 3/1991 | Koishi et al. | 280/103 |
| 5,529,141 | A | * | 6/1996 | Lehman et al. | 180/209 |
| 5,575,352 | A | * | 11/1996 | Suzuki et al. | 180/311 |
| 6,446,748 | B1 | | 9/2002 | Suzuki | |
| 6,802,400 | B2 | | 10/2004 | Ohura | |
| 6,851,691 | B2 | * | 2/2005 | Rasidescu et al. | 280/124.135 |
| 7,520,516 | B2 | | 4/2009 | Murata | |
| 7,600,599 | B1 | * | 10/2009 | Dahl et al. | 180/249 |
| 2008/0150249 | A1 | | 6/2008 | Murata | |
| 2012/0211960 | A1 | * | 8/2012 | Bowers | 280/124.111 |

* cited by examiner

*Primary Examiner* — Keith Frisby
(74) *Attorney, Agent, or Firm* — Ulmer & Berne LLP

(57) ABSTRACT

A rear axle support assembly includes a swing arm assembly, a second axle tube, and a rear final gear assembly. The swing arm assembly includes a first support arm, a second support arm laterally spaced from the first support arm, a first axle tube attached to the first support arm, and an axle support bracket attached to the second support arm. Each of the first and second axle tubes is configured to receive an axle therewithin. The second axle tube includes an axle tube mount flange. The first axle tube is releasably attached to the rear final gear assembly. The axle tube mount flange is positioned laterally between, and is releasably attached to each one of, the axle support bracket of the swing arm assembly and the rear final gear assembly, and in direct, contacting engagement with the rear final gear assembly.

20 Claims, 7 Drawing Sheets

REAR AXLE SUPPORT ASSEMBLY

TECHNICAL FIELD

A rear axle support assembly is configured for association with a rear axle of a vehicle.

BACKGROUND

Some known all terrain vehicles include a swing arm assembly that is pivotally coupled with a frame of the vehicle and is associated with left and right rear axle tubes. Each of the left and right rear axle tubes is releasably attached to a rear final gear assembly of the vehicle.

SUMMARY

In one embodiment, a rear axle support assembly includes a swing arm assembly that includes a first support arm, a second support arm laterally spaced from the first support arm and a first axle tube attached to the first support arm. The swing arm assembly further includes an axle support bracket attached to the second support arm and defining an aperture. The rear axle support assembly further includes a second axle tube and a rear final gear assembly. Each of the first axle tube and the second axle tube is configured to receive an axle therewithin. The second axle tube includes an axle tube mount flange. The axle tube mount flange of the second axle tube is releasably attached to each of the axle support bracket of the swing arm assembly and the rear final gear assembly. The axle tube mount flange is positioned laterally between the axle support bracket and the rear final gear assembly, and in direct, contacting engagement with the rear final gear assembly.

According to another embodiment, a vehicle includes a frame, at least one front wheel rotatably coupled with the frame, and at least one rear wheel rotatably coupled with the frame. The vehicle also includes a rear axle rotatably coupled with the at least one rear wheel. The vehicle further includes a rear axle support assembly coupled with the rear axle. The rear axle support assembly includes a swing arm assembly pivotally coupled with the frame. The swing arm assembly includes a first support arm, a second support arm laterally spaced from the first support arm, a first axle tube non-releasably attached to the first support arm and an axle support bracket attached to the second support arm. The rear axle support assembly further includes a second axle tube and a rear final gear assembly. The rear axle extends within each of the first axle tube and the second axle tube. The second axle tube includes an axle tube mount flange releasably attached to each of the axle support bracket and the rear final gear assembly. The axle tube mount flange is positioned laterally between the axle support bracket and the rear final gear assembly, and in direct, contacting engagement with the rear final gear assembly.

According to another embodiment, a vehicle includes a frame, at least one front wheel rotatably coupled with the frame, and at least one rear wheel rotatably coupled with the frame. The vehicle also includes a rear axle rotatably coupled with the at least one rear wheel. The vehicle also includes a rear axle support assembly that includes a swing arm assembly pivotally coupled with the frame. The swing arm assembly also includes a first support arm, a second support arm laterally spaced from the first support arm, a first axle tube welded to the first support arm, and an axle support bracket attached to the second support arm. The rear axle support assembly further includes a second axle tube, and a rear final gear assembly coupled with the rear axle. The rear axle extends within each of the first axle tube and the second axle tube. The second axle tube includes an axle tube mount flange and the rear final gear assembly includes a housing. The axle tube mount flange is releasably attached to each of the axle support bracket and the housing of the rear final gear assembly. The axle tube mount flange is positioned laterally between the axle support bracket and the housing, and in direct, contacting engagement with the housing. The axle support bracket defines an aperture having a first shape. The axle tube mount flange includes a perimeter having a second shape that is complementary with the first shape.

BRIEF DESCRIPTION OF THE DRAWINGS

Various embodiments will become better understood with regard to the following description, appended claims and accompanying drawings wherein:

DETAILED DESCRIPTION

Figure 1:
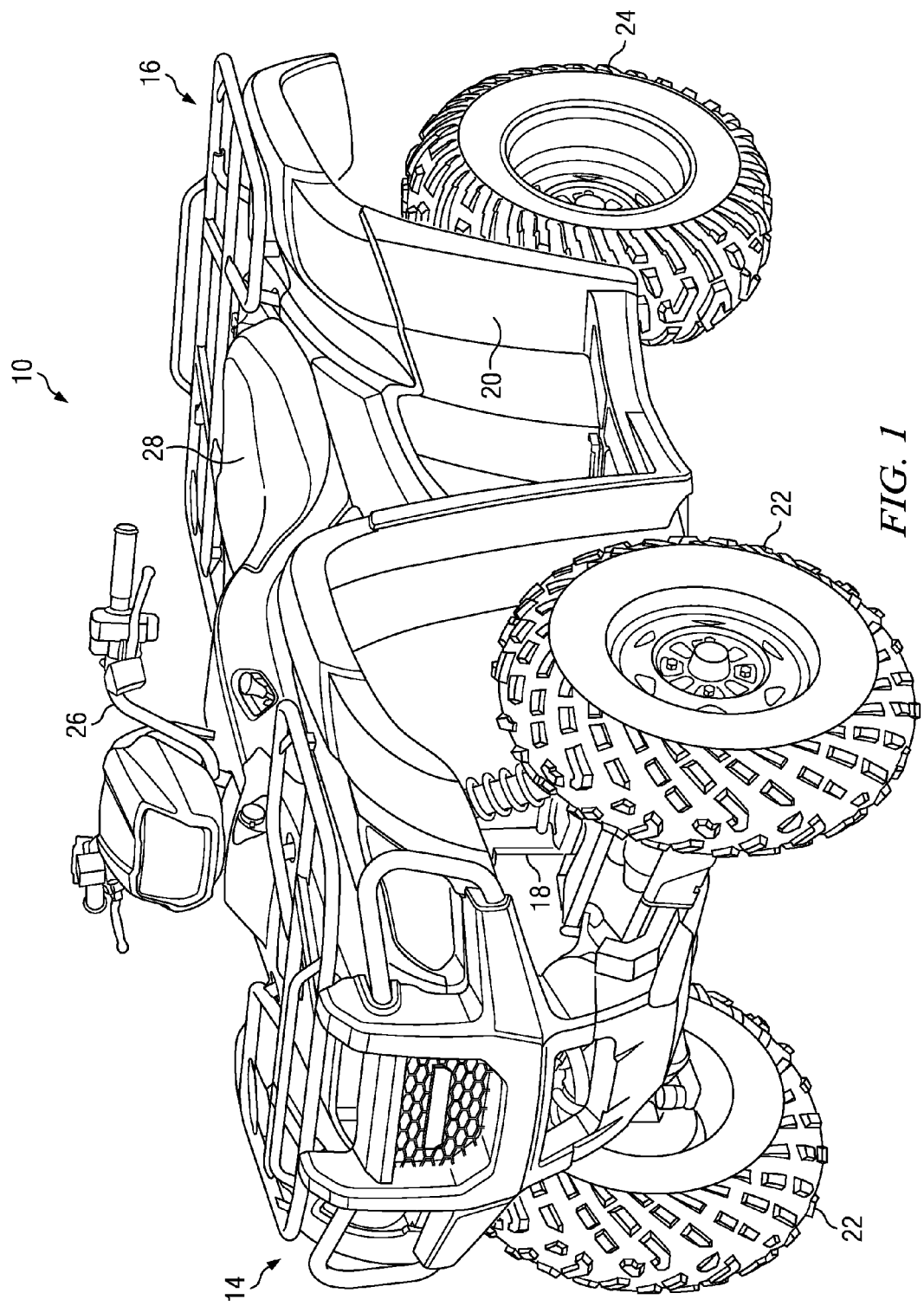
FIG. 1 is a left front perspective view depicting a vehicle.

Certain embodiments are herein described in connection with the views and examples of FIGS. 1-6 wherein like numbers indicate the same or corresponding elements through the views. FIG. 1 illustrates a vehicle 10 that can include a rear axle support assembly 12 (FIGS. 2-6) in accordance with one embodiment. As illustrated in FIG. 1, the vehicle 10 can be an all terrain vehicle (ATV), but in other embodiments, the vehicle 10 can be another variety of saddle-type vehicle, an automobile, a truck, or any of a variety of other types of vehicles, for example. The vehicle 10 can include a front end 14 and a rear end 16. The vehicle 10 can also include a frame 18. At least a portion of frame 18 can have a tubular construction. However, the frame 18 can be provided in any of a variety of other suitable arrangements, such as in a unibody construction, for example, and can be formed using any of a variety of materials, such as metal or carbon fiber, for example. The frame 18 can support a body 20 (FIG. 1) that can include a variety of panels, with one or more of the panels being a decorative panel in some embodiments. The rear axle support assembly 12 can be pivotally coupled with the frame 18, as subsequently discussed.

The vehicle 10 can include a pair of front wheels 22 and a pair of rear wheels 24 (one shown). The front wheels 22 and the rear wheels 24 can be rotatably coupled with the frame 18. The front wheels 22 can be steerable wheels. A handlebar assembly 26 can be coupled with the front wheels 22 to facilitate steering of the front wheels 22. Vehicle 10 can also include a seat 28 that can be supported by at least one of the frame 18 and the body 20 of the vehicle 10, and which can be configured to support an operator of the vehicle 10.

Vehicle 10 can include an engine (not shown), which can be an internal combustion engine and/or an electric motor, for example. Vehicle 10 can also include a transmission (not shown) that can be coupled with the engine, and a rear drivetrain that can be coupled with the transmission and with each of the rear wheels 24, such that the rear drivetrain can be operable for selectively transmitting torque from the transmission to the rear wheels 24, causing the rear wheels 24 to rotate. The rear drivetrain can include a drive shaft 30 (FIGS. 2-4 and 6), which can be coupled, at a forward end, with the transmission. In some embodiments, the vehicle 10 can be configured as a selectable four wheel drive (4WD), or all wheel drive (AWD), vehicle. In such embodiments, the vehicle 10 can also include a forward drivetrain (not shown), which can be coupled at a rearward end with the transmission, and can also be coupled with each of the front wheels 22. Accordingly, torque can be selectively transmitted from the transmission to the front wheels 22, causing the front wheels 22 to rotate. In other embodiments, the vehicle 10 can be configured as a two wheel drive (2WD) vehicle, for example for selectively transmitting torque from the transmission to the rear wheels 24, as in the embodiment of FIGS. 1-6, or alternatively, to selectively transmit torque from the transmission to the front wheels 22.

Referring to FIGS. 2-6, the rear axle support assembly 12 can include a swing arm assembly 34, which can include a first support arm 36 and a second support arm 38, which can be laterally spaced from the first support arm 36 as shown in FIGS. 2-4 and 6. The swing arm assembly 34 can also include a cross-member 40, which can extend between each of the first and second support arms 36, 38, and can be attached to each of the first and second support arms 36, 38. The swing arm assembly 34 can also include a pair of coupling members 42. As shown in FIGS. 2-4 and 6, one of the coupling members 42 can be attached to a forward end 37 of the first support arm 36 and the other one of the coupling members 42 can be attached to a forward end 39 of the second support arm 38. In one embodiment, each coupling member 42 can be hollow, and can have a cylindrical shape. In such an embodiment, pivots, e.g., a pair of pivots 44 (FIG. 6), which can be bolts, pins, or the like, can be provided through the frame 18 (not shown in FIGS. 2-6) and respective ones of the coupling members 42 to facilitate pivotal coupling of the swing arm assembly 34 with the frame 18 and pivoting of the swing arm assembly 34 about an axis 46 (FIG. 6), such that the rear axle support assembly 12 is pivotally coupled with the frame 18.

Figure 6:
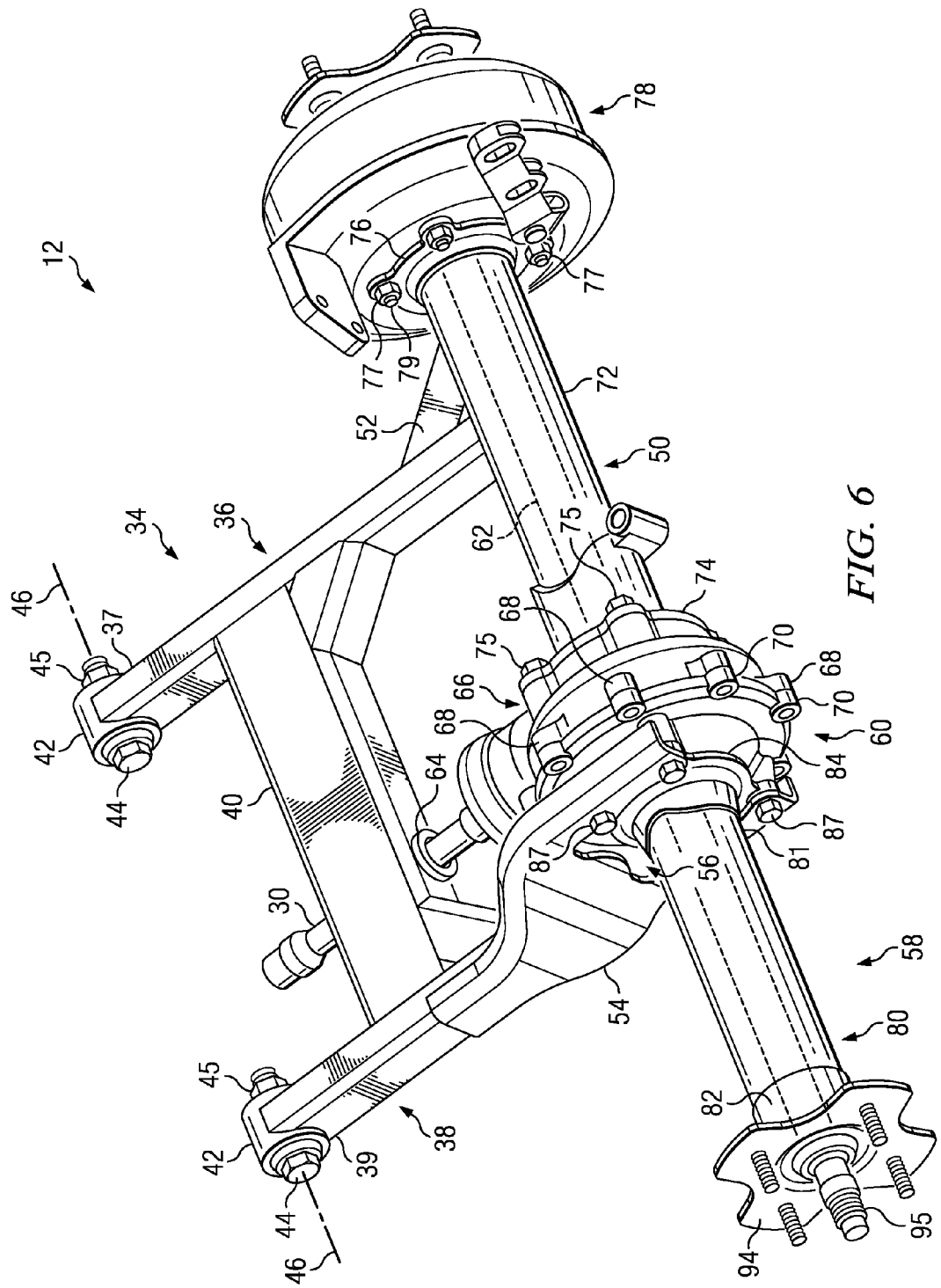
FIG. 6 is a left rear perspective view depicting the rear axle support assembly shown in FIGS. 2-4, in an assembled configuration and in association with the rear axle and the rear brake assembly.

The pivots 44 can be retained in any suitable manner. For example, each pivot 44 can be retained by a fastener, e.g., nut 45 (FIG. 6). It will be appreciated that the swing arm assembly 34 can be pivotally coupled with a frame in any of a variety of suitable alternative arrangements.

The swing arm assembly 34 can also include a first axle tube 50 that can be fixedly, and non-releasably attached to the first support arm 36, e.g., the first axle tube 50 can be welded to the first support arm 36. The swing arm assembly 34 can also include a brace 52, which can be attached to each of the first support arm 36 and the first axle tube 50, (e.g., welded), which can provide additional support for the first axle tube 50. Swing arm assembly 34 can also include an axle support bracket 54, which can be attached to the second support arm 38 (e.g., welded). The axle support bracket 54 can define an aperture 56.

The rear axle support assembly 12 can also include a second axle tube 58 and a rear final gear assembly 60. Each of the first axle tube 50 and the second axle tube 58 can be configured to receive an axle 62 of vehicle 10, e.g., each of the first and second axle tubes 50, 58 can define a respective hollow interior which can receive the axle 62. Each of the first axle tube 50 and the second axle tube 58 can be releasably attached to the rear final gear assembly 60 and can extend laterally outwardly from the rear final gear assembly 60. As shown in FIGS. 2-6, in one embodiment, the axle 62 can be a rear axle of vehicle 10, the first axle tube 50 can be a right rear axle tube, and the second axle tube 58 can be a left rear axle tube. In other embodiments, rear axle support assemblies can be provided that include a swing arm assembly that includes a pair of laterally spaced support arms and a left rear axle tube non-releasably attached, e.g., welded, to a left one of the support arms, and with the rear axle support assembly including a right rear axle tube releasably attached to the swing arm assembly. The axle 62 can extend through the hollow interior of each of the first and second axle tubes 50, 58 as shown in FIG. 6.

The drive shaft 30, which can be coupled at a forward end with the transmission (not shown) of vehicle 10, can also be coupled, at a rear end, with the rear final gear assembly 60. The axle 62 can also be coupled with the rear final gear assembly 60, and with each of the rear wheels 24, such that torque can be transmitted from the transmission to the rear wheels 24, causing the rear wheels 24 to rotate. The cross-member 40 of the swing arm assembly 34 can be configured to receive the drive shaft 30, such that the drive shaft 30 can extend through the cross-member 40, in a longitudinal direction. For example, the cross-member 40 can define an interior chamber (not shown), and can include a rear sleeve 64 and a forward sleeve (not shown), with each of the rear sleeve 64 and the forward sleeve communicating with the interior chamber of cross-member 40 and configured to receive the drive shaft 30.

The rear final gear assembly 60 can include a housing 66 and a gear assembly (not shown) supported within the housing 66 and coupled with each of the drive shaft 30 and the axle 62. In one embodiment, the housing 66 can include first and second portions to facilitate assembly, with the first and second portions being releasably attached to one another. For example, the first portion of housing 66 can include a first plurality of circumferentially spaced mount lugs 68, with each of the mount lugs 68 defining a threaded aperture, and the second portion of housing 66 can include a second plurality of mount lugs 70, with each of the mount lugs 70 defining an aperture. The first and second portions of the housing 66 can be oriented such that each of the apertures defined by the mount lugs 68 is aligned with the aperture defined by a respective one of the mount lugs 70. Male fasteners (not shown) can be inserted through respective apertures defined by the mount lugs 70 and into respective, aligned ones of the threaded apertures defined by the mount lugs 68 to facilitate attachment together of the first and second portions of the housing 66.

The first axle tube 50 can include a tubular portion 72, a laterally inner flange 74 that can be attached to a laterally inner end of the tubular portion 72, and a laterally outer flange 76 that can be attached to a laterally outer end of the tubular portion 72. The laterally inner flange 74 can be releasably attached to the housing 66 of the rear final gear assembly 60. For example, the laterally inner flange 74 can define a plurality of apertures (not shown), and each of the apertures can be configured to receive a respective male fastener, such as a bolt 75 as shown in FIGS. 2-4 and 6, with each of the bolts 75 extending through a respective aperture defined by the laterally inner flange 74 and threaded into a respective, aligned, threaded aperture (not shown) defined by housing 66.

The vehicle 10 can include a rear brake assembly 78 (FIGS. 2-4 and 6). In one embodiment, the rear brake assembly 78 can be coupled with the right one (not shown) of the rear wheels 24. The first axle tube 50 can be releasably attached to the rear brake assembly 78. For example, the rear brake assembly 78 can include a plurality of threaded studs 79 and the laterally outer flange 76 of the first axle tube 50 can define a plurality of apertures (not shown), and each one of the apertures can receive a respective one of the threaded studs 79. The rear axle support assembly 12 can include a plurality of female fasteners, such as nuts 77, and each one of the nuts 77 can be threaded onto a respective one of the threaded studs 79 to releasably attach the outer flange 76 of the first axle tube 50 to the rear brake assembly 78. The axle 62 can be coupled with the rear brake assembly 78 and can also be coupled with a left rear hub 94 (FIG. 6). As shown in FIG. 6, an outer end 95 of the axle 62 can protrude outwardly from the left rear hub 94.

The second axle tube 58 can include a tubular portion 80 that can include a laterally inner end 81 and a laterally outer end 82. The second axle tube 58 can also include an axle tube mount flange 84, which can be attached to the laterally inner end 81 of the tubular portion 80 of the second axle tube 58. The aperture 56 defined by the axle support bracket 54, which can be attached to the second support arm 38 of the swing arm assembly 34, can have a first shape. The axle tube mount flange 84 can include a perimeter 85, which can have a second shape that can be complementary with the first shape of the aperture 56. The axle tube mount flange 84 can define a first plurality of holes 86, with each of the holes 86 being configured to receive a male fastener, for example a respective one of a plurality of bolts 87 (FIGS. 4 and 6) of the rear axle support assembly 12. The axle tube mount flange 84 can include a plurality of mount ears 88 spaced from one another. Each of the mount ears 88 can define a respective one of the first plurality of holes 86. The first plurality of holes 86 can be unequally spaced from one another. In one embodiment, the first plurality of holes 86 can be arranged in a rectangular pattern. The complementary shapes of the aperture 56 of the axle support bracket 54 and the perimeter 85 of the axle tube mount flange 84, in combination with the rectangular pattern of the first plurality of holes 86, can facilitate positioning the axle tube mount flange 84 laterally between the axle support bracket 54 and the housing 66 of the rear final gear assembly 60, for example, as subsequently described.

Figure 2:
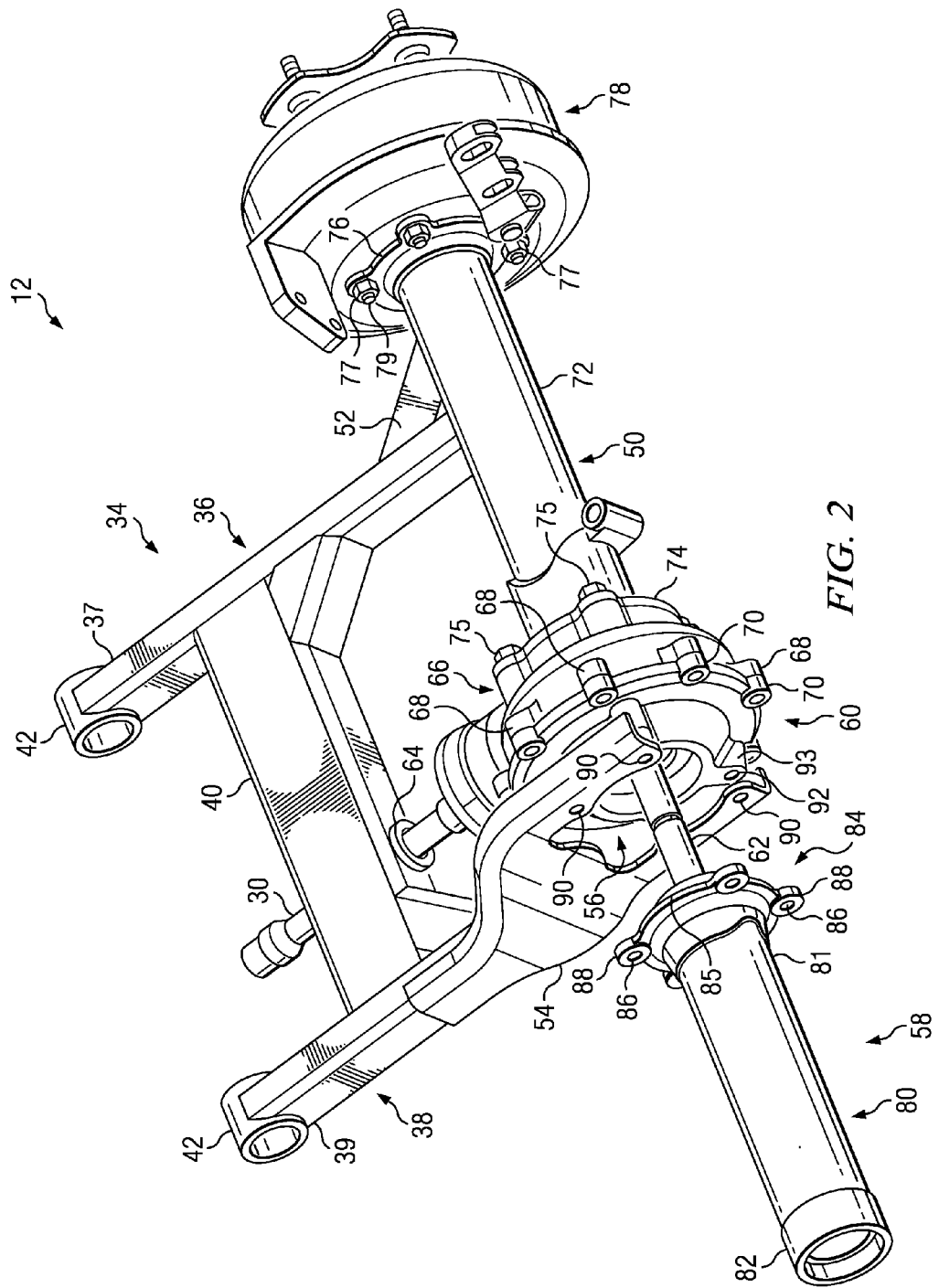
FIG. 2 is a partially exploded, left rear perspective view depicting a rear axle support assembly according to one embodiment, a rear brake assembly, a portion of a rear axle, and a drive shaft, of the vehicle of FIG. 1, with a left rear axle tube of the rear axle support assembly being depicted in a first angular orientation and apart from the remainder of the rear axle support assembly.
Figure 3:
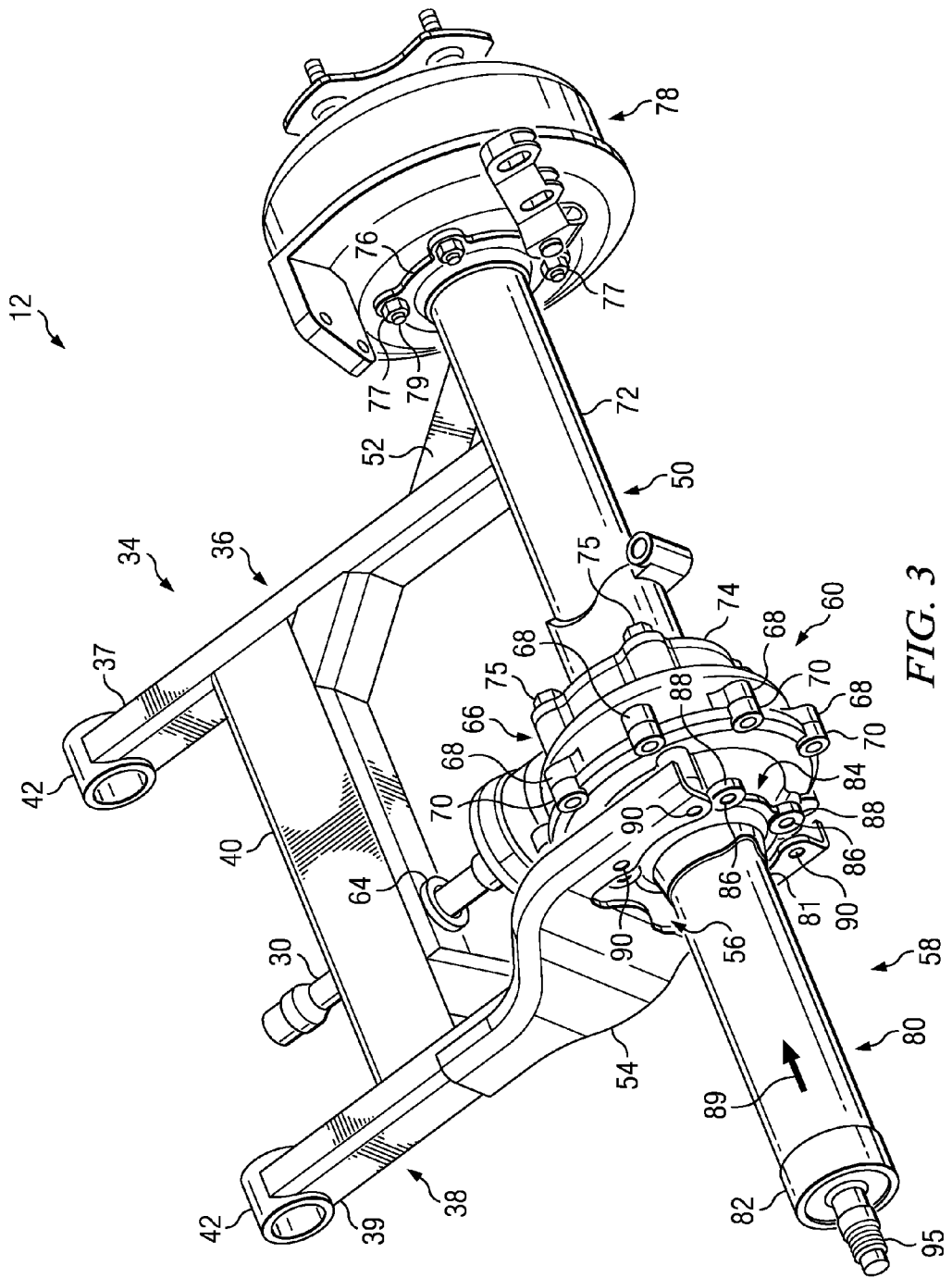
FIG. 3 is a left rear perspective view similar to FIG. 2, depicting the left rear axle tube in the first angular orientation, but depicting an axle tube mount flange of the left rear axle tube positioned laterally between a support arm of a swing arm assembly and a rear final gear assembly of the rear axle support assembly.
Figure 4:
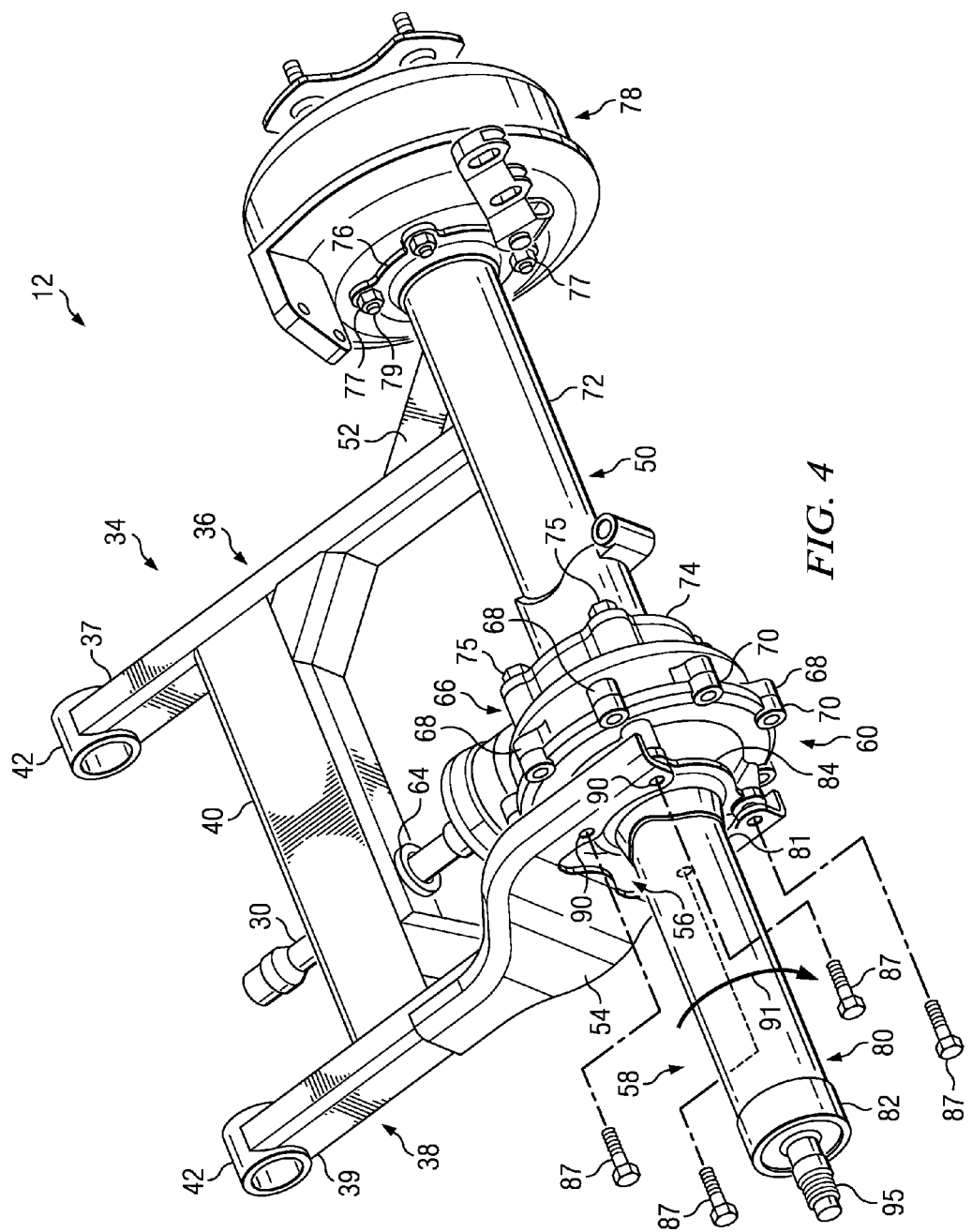
FIG. 4 is a partially exploded, left rear perspective view similar to FIG. 3, but with the axle tube mount flange of the left rear axle tube being depicted in a second angular orientation and depicting a plurality of male fasteners positioned apart from the remainder of the rear axle support assembly.
Figure 5A:
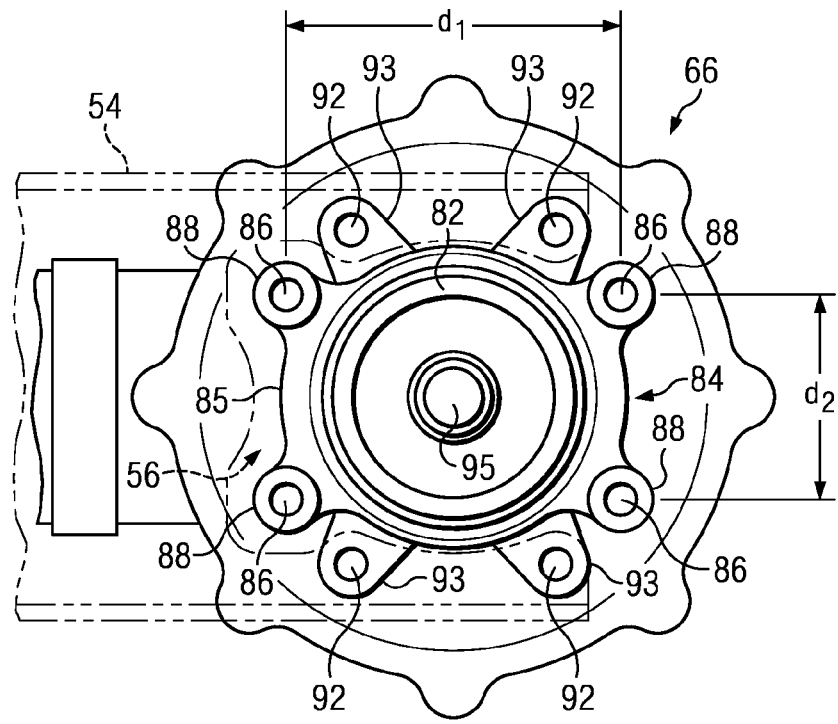
FIG. 5A is a fragmentary, left side elevational view, depicting the left rear axle tube in association with the rear final gear assembly of the rear axle support assembly, and an axle support bracket of the swing arm assembly, with the axle tube mount flange of the left rear axle tube in the first angular orientation depicted in FIGS. 2 and 3.

The axle support bracket 54 can define a second plurality of holes 90 (FIGS. 2-4). The holes 90 can also be unequally spaced, and can be arranged in a rectangular pattern that is the same as the pattern of the first plurality of holes 86 defined by the axle tube mount flange 84. The housing 66 of the rear final gear assembly 60 can define a third plurality of holes 92 (FIG. 5A). The holes 92 can also be unequally spaced, and can be arranged in a rectangular pattern that is the same as the pattern of the first plurality of holes 86 and the same as the pattern of the second plurality of holes 90. The housing 66 of the rear final gear assembly 60 can include a plurality of mount bosses 93 (FIG. 5A), and each one of the mount bosses 93 can define a respective one of the third plurality of holes 92. In one embodiment, the holes 86 and the holes 90 can be clearance holes, and the holes 92 can be threaded holes. In this embodiment, each bolt 87 can extend through a respective one of the holes 86 and a respective, aligned one of the holes 90, and can be threaded into a respective, aligned one of the holes 92.

Figure 7:
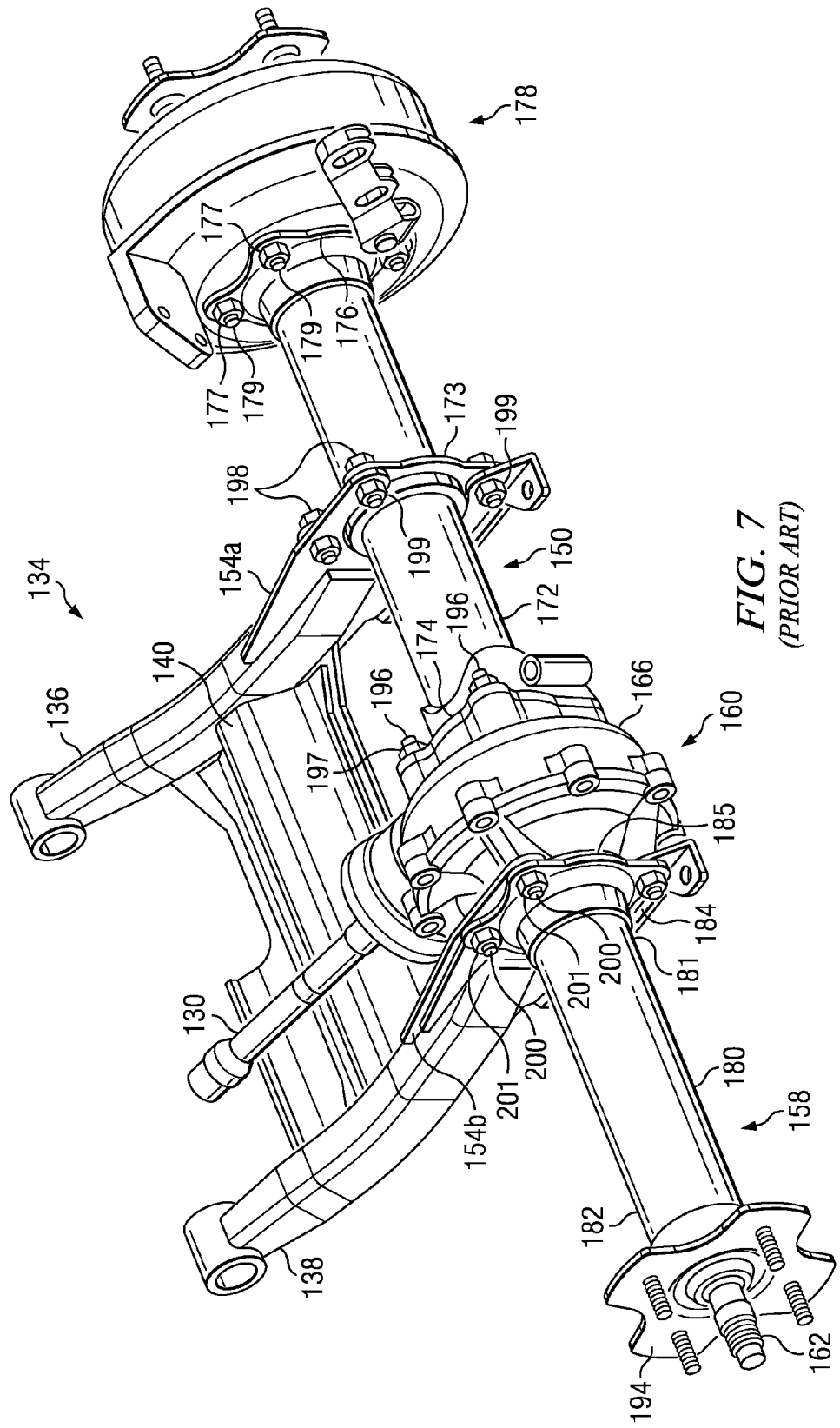
FIG. 7 is a left rear perspective view depicting a prior art swing arm assembly in association with prior art left and right rear axle tubes, and further depicting a prior art rear final gear assembly, a prior art drive shaft, and a prior art rear brake assembly, of a conventional vehicle.

FIG. 7 illustrates a prior art swing arm assembly 134, a prior art rear final gear assembly 160, a prior art rear brake assembly 178, a prior art right rear axle tube 150, and a prior art left rear axle tube 158, of a conventional vehicle (not shown). FIG. 7 also illustrates a prior art drive shaft 130 that is coupled with the rear final gear assembly 160, and a portion of a prior art axle 162 that is also coupled with the rear final gear assembly 160. The axle 162 is also coupled with the rear brake assembly 178 and with a left rear hub 194. The rear final gear assembly 160 includes a housing 166.

The swing arm assembly 134 includes a first support arm 136, a second support arm 138 that is laterally spaced from the first support arm 136, and a cross-member 140 that extends between, and is attached to each one of, the first support arm 136 and the second support arm 138. The swing arm assembly 134 also includes a first axle support bracket 154a welded to the first support arm 136, and a second axle support bracket 154b welded to the second support arm 138.

The right rear axle tube 150 includes a tubular portion 172, a laterally inner flange 174 attached to the tubular portion 172, a laterally outer flange 176 attached to the tubular portion 172, and an intermediate flange 173 positioned between the laterally inner flange 174 and the laterally outer flange 176, and attached to the tubular portion 172. The laterally inner flange 174 is releasably attached to the rear final gear assembly 160. The housing 166 of the rear final gear assembly 160 includes a plurality of threaded studs 196, with each of the threaded studs 196 extending through a respective hole defined by the laterally inner flange 174. Each threaded stud 196 is threadedly engaged with a respective nut 197 to releasably attach the laterally inner flange 174 to the rear final gear assembly 160. The laterally outer flange 176 is releasably attached to the rear brake assembly 178 using nuts 177, and threaded studs 179 of the rear brake assembly 178. Each of the studs 179 extends through a respective hole (not shown) defined by the laterally outer flange 176 and is threadedly engaged with a respective one of the nuts 177.

The right rear axle tube 150 is releasably attached, indirectly, to the first control arm 136 of swing arm assembly 134. The intermediate flange 173 defines a plurality of holes (not shown), with each one of the holes aligned with a respective one of a plurality of holes (not shown) defined by the axle support bracket 154a. The swing arm assembly 134 includes a plurality of bolts 198 and a plurality of nuts 199. Each one of the bolts 198 extends through one of the holes defined by the intermediate flange 173 and a respective, aligned one of the holes defined by the axle support bracket 154a. Each of the nuts 199 is threaded onto a respective one of the bolts 198, which releasably attaches the intermediate flange 173 to the axle support bracket 154a, which releasably attaches the right rear axle tube 150 to the swing arm assembly 134.

The left rear axle tube 158 includes a tubular portion 180 that includes a laterally inner end 181 and a laterally outer end 182. The left rear axle tube 158 also includes an axle tube mount flange 184 attached to the laterally inner end 181 of the tubular portion 180. The rear final gear assembly 160 includes a plurality of threaded studs 200 extending away from the housing 166. The studs 200 are arranged in a rectangular pattern. The axle support bracket 154b defines a plurality of holes (not shown) that are also arranged in a rectangular pattern. The axle tube mount flange 184 also defines a plurality of holes arranged in a rectangular pattern. The swing arm assembly 134 further includes a plurality of nuts 201. Each of the threaded studs 200 of the rear final gear assembly 160 extends through a respective one of the holes defined by the axle support bracket 154b and a respective, aligned one of the holes defined by the axle tube mount flange 184. Each one of the nuts 201 of the swing arm assembly 134 is threaded onto a respective one of the threaded studs 200 of the rear final gear assembly 160, which releasably attaches the axle tube mount flange 184 of the left rear axle tube 158 to each of the axle support bracket 154b of the swing arm assembly 134, and to the rear final gear assembly 160. As shown in FIG. 7, the axle tube mount flange 184 is not positioned laterally between the axle support bracket 154b and the housing 166 of the rear final gear assembly 160, and is not in contacting engagement with the housing 166. Instead, as shown in FIG. 7, the axle tube mount flange 184 is in contacting engagement with a laterally outward surface of the axle support bracket 154b. The axle support bracket 154b defines an aperture that is open at a rear end, and that has a first shape. A substantial portion of the first shape is circular, i.e., over 180 degrees of a circle. The axle tube mount flange 184 includes a perimeter 185, that has a second shape, which is not complementary with the shape of the aperture defined by the axle support bracket 154b.

FIG. 2 illustrates the rear axle support assembly 12 in one stage of assembly, with the second axle tube 58 detached from the axle support bracket 54 and the rear final gear assembly 60. FIG. 2 illustrates the second axle tube 58, including the axle tube mount flange 84, in a first angular orientation. In this first angular orientation, the perimeter 85 of the axle tube mount flange 84 can be aligned, or at least generally aligned, with the aperture 56 defined by the axle support bracket 54, such that the axle tube mount flange 84 can be inserted laterally through the aperture 56. As shown in FIG. 5A, which also illustrates the axle tube mount flange 84 in the first angular orientation, a distance $d_1$ between the adjacent upper ones of the holes 86 extends in a generally longitudinal direction and is greater than a distance $d_2$ between each vertically adjacent pair of the holes 86, for example the distance $d_2$ between the rear pair of holes 86, as shown in FIG. 5A. Adjacent lower ones of the holes 86 can also be spaced by the distance $d_1$. In this first orientation, the holes 86 can be mis-aligned with the holes 92 defined by the mount bosses 93 of housing 66 of the rear final gear assembly 60, as shown in FIG. 5A, and can also be mis-aligned with the holes 90 (not shown in FIG. 5A) defined by the axle support bracket 54. FIG. 3 illustrates a subsequent stage of assembly, with the second axle tube 58 translated inwardly as represented by arrow 89 in FIG. 3, such that the axle tube mount flange 84 is positioned laterally between the axle support bracket 54 and the housing 66 of the rear final gear assembly 60, after passing through the aperture 56 defined by the axle support bracket 54. The angular orientation of the axle tube 58 shown in FIG. 3 can be the same as that shown in FIG. 2.

Figure 5B:
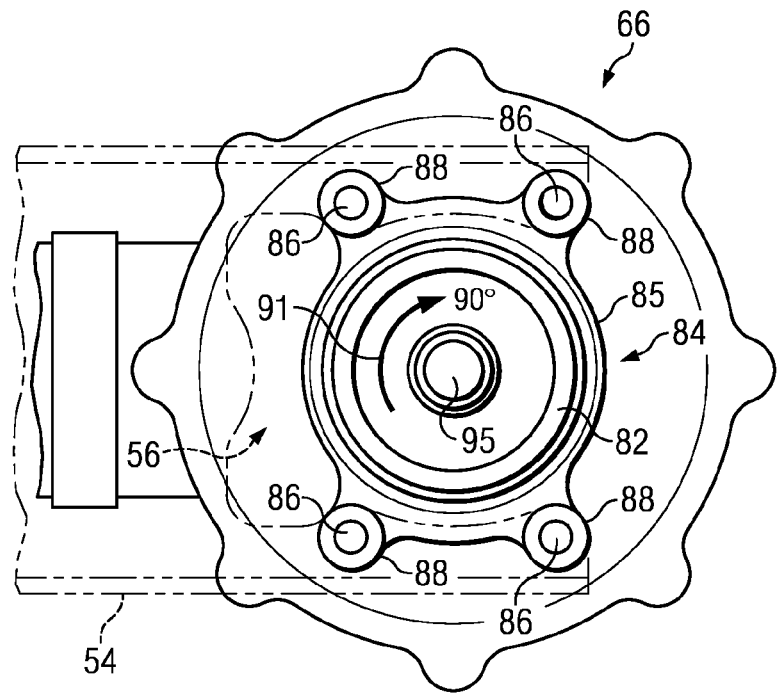
FIG. 5B is a fragmentary, left side elevational view similar to FIG. 5A, but with the left rear axle tube being depicted in the second angular orientation shown in FIG. 4.

FIG. 4 illustrates the axle tube 58 in the same lateral position as shown in FIG. 3, but illustrates the second axle tube 58 in a second angular orientation, which can result from a rotation of the second axle tube 58 in a clockwise direction as represented by arrow 91 in FIG. 4, which can be a clockwise rotation of 90 degrees from the first angular orientation shown in FIGS. 2 and 3. FIG. 5B also illustrates the axle tube mount flange 84 in the second angular orientation. As a result of the rotation of the second axle tube 58 and the rectangular pattern of the holes 86, two of the holes 86 can be positioned above the aperture 56 and two of the holes 86 can be positioned below the aperture 56, such that in the second angular orientation, each of the holes 86 can be aligned with a respective one of the holes 90 and a respective one of the holes 92. It will be appreciated that alignment among the holes 86, 90 and 92 can also be achieved by rotating the second axle tube 58 in a counterclockwise direction from the first angular orientation shown in FIGS. 2 and 3, for example a counterclockwise rotation of 90 degrees. FIG. 4 depicts the bolts 87 exploded outwardly from the axle support bracket 54, prior to releasably attaching the axle tube mount flange 84 to each of the axle support bracket 54 and the housing 66 of the rear final gear assembly 60. FIG. 6 illustrates the axle tube mount flange 84 releasably attached to each of the axle support bracket 54 and the housing 66 of the rear final gear assembly 60, such that the second axle tube 58 is releasably attached to the swing arm assembly 34 and the rear final gear assembly 60.

Use of the rear axle support assembly 12, can result in various advantages. For example, the non-releasable attachment of the first axle tube 50 to the first axle support arm 36 of the swing arm assembly 34 can reduce cost relative to the assembly of the prior art right rear axle tube 150 of the prior art swing arm assembly 134 shown in FIG. 7. In particular, use of the rear axle support assembly 12 can reduce assembly time and the associated cost, by eliminating the time and costs associated with releasably attaching the intermediate flange 173 of the right rear axle tube 150 to the axle support bracket 154a of the prior art swing arm assembly 134, including the costs of bolts 198 and nuts 199, that are not required as a result of the non-releasable attachment of the first axle tube 50 to the first support arm 36 of the swing arm assembly 34 of the rear axle support assembly 12. Positioning the axle tube mount flange 84 of the second axle tube 58 laterally between the axle support bracket 54, which can be attached to the second control arm 38 of the swing arm assembly 34, and the housing 66 of the rear final gear assembly 60, with the axle tube mount flange 84 in direct, contacting engagement with the housing 66, can provide a more rigid connection between the second axle tube 58 and the rear final gear assembly 60, as compared to the arrangement of FIG. 7. Configuring the axle tube mount flange 84 of the second axle tube 58 and the axle support bracket 54, such that the shape of the perimeter 85 of the axle tube mount flange 84 is complementary with the shape of the aperture 56 defined by the axle support bracket 54, can facilitate positioning the axle tube mount flange 84 laterally between the axle support bracket 54 and the housing 66 of the rear final gear assembly 60, and in contacting engagement with the housing 66.

Use of the rear axle support assembly 12 can also facilitate assembly of the second axle tube 58, which is shown to be a left rear axle tube in the embodiment of FIGS. 1-6, to the axle support bracket 54 of the swing arm assembly 34, and to the housing 66 of the rear final gear assembly 60. Additionally, the configuration of the rear axle support assembly 12 can reduce the stress in the axle support bracket 54. The assembly of the second axle tube 58 to the axle support bracket 54 and housing 66, can enhance the service life of the axle support bracket 54, for example, as subsequently described.

In the embodiment shown, it can be necessary to insert the axle 62 through three sets of bearings during assembly. For example, it can be necessary to insert the axle 62 through a first set of bearings contained within the housing 66 of the rear final gear assembly 60, through a second set of bearings contained within the rear brake assembly 78, and through a third set of bearings adjacent the laterally outer end 82 of the tubular portion 80 of the second axle tube 58. In one embodiment, the axle 62 can be inserted through the first, second and third sets of bearings in the order described above, but in other embodiments, it will be appreciated that the axle 62 can be inserted through the three sets of bearings in other sequences.

Due to manufacturing tolerances that can be associated with various parts, the alignments among the apertures/holes defined by various flanges, may be such as to inhibit, or prevent, assembly of the axle 62. For example, due to manufacturing tolerances associated with the following apertures/holes, assembly of the axle 62 can be difficult: the apertures (not shown) defined by the laterally outer flange 76 of the first axle tube 50; the apertures (not shown) defined by the laterally inner flange 74 of the first axle tube 50 and mating apertures (not shown) defined by the housing 66 of the rear axle assembly 60; and holes 86 defined by the axle tube mount flange 84 and mating ones of the holes 92 defined by the mount bosses 93 of the rear final gear assembly 60.

Accordingly, in order to facilitate, or permit, effective assembly of the axle 62 through each set of bearings, it can be necessary, for one or more pairs of components, to nest a machined flange of one component into a machined recess formed in a mating component. For example, the laterally inner flange 74 of the first axle tube 50 can be machined, with relatively small tolerances, and can be nested within a machined recess (not shown) formed in the casing 66 of the rear final gear assembly 60. As a result, a lateral gap between the first axle tube 50, which is shown to be a right rear axle tube, and the axle support bracket 54, can be required to be larger than a thickness (as measured in a lateral direction) of the housing 66, so that the housing 66 can be moved in a rearward-to-forward direction to align the apertures defined by the laterally inner flange 74 with the holes defined by the housing 66. After this alignment is achieved, the housing 66 can be moved toward the laterally inner flange 74, such that the laterally inner flange 74 is nested within the recess defined by the housing 66. In the absence of the configuration of the swing arm assembly 12, a lateral gap (not shown) would exist between the axle support bracket 54 and the housing 66. In this event, during assembly of the second axle tube 58 to the axle tube support bracket 54 and the housing 66, it would be necessary to deflect the axle tube support bracket 54.

As a result of the configuration of the rear axle support assembly 12, the axle tube support flange 84 can be positioned within this lateral gap (not shown) between the housing 66 and the axle tube support bracket 54, by passing the axle tube support flange through the aperture 56 defined by the axle tube support bracket 54. Accordingly, the configuration of the rear axle support assembly 12 can at least significantly reduce (i.e., substantially eliminate) the deflection of the axle tube support bracket 54 that might result from assembling the second axle tube 58 to the axle tube support bracket 54 and the housing 66. As a result, the service life of the axle tube support bracket 54 can be enhanced.

While various embodiments of a rear axle support assembly, and a vehicle that includes a rear axle support assembly, have been illustrated by the foregoing description in considerable detail, it is not intended to restrict or in any way limit the scope of the appended claims to such detail. Additional modifications will be readily apparent to those skilled in the art.

What is claimed is:

1. A rear axle support assembly comprising:
a swing arm assembly comprising a first support arm, a second support arm laterally spaced from the first support arm, a first axle tube attached to the first support arm, and an axle support bracket attached to the second support arm and defining an aperture;
a second axle tube, each of the first axle tube and the second axle tube being configured to receive an axle therewithin, the second axle tube comprising an axle tube mount flange; and
a rear final gear assembly; wherein
the axle tube mount flange of the second axle tube is releasably attached to each of the axle support bracket of the swing arm assembly and the rear final gear assembly, the axle tube mount flange being positioned laterally between the axle support bracket and the rear final gear assembly and in direct, contacting engagement with the rear final gear assembly.

2. The rear axle support assembly of claim 1, wherein:
the first axle tube of the swing arm assembly is non-releasably attached to the first support arm of the swing arm assembly.

3. The rear axle support assembly of claim 2, wherein:
the aperture defined by the axle support bracket comprises a first shape; and
the axle tube mount flange comprises a perimeter, the perimeter comprising a second shape, the second shape being complementary with the first shape.

4. The rear axle support assembly of claim 3, wherein:
the axle tube mount flange defines a first plurality of holes, the first plurality of holes being arranged in a rectangular pattern; and
each of the first plurality of holes is configured to receive a male fastener.

5. The rear axle support assembly of claim 4, wherein:
the axle support bracket defines a second plurality of holes;
the rear final gear assembly comprises a housing, the housing defining a third plurality of holes, the axle tube mount flange being releasably attached to the housing;
when the axle tube mount flange is in a first angular orientation, prior to attachment of the axle tube mount flange to the axle support bracket and the housing of the rear final gear assembly, the perimeter of the axle tube mount flange is at least generally aligned with the aperture defined by the axle support bracket, to permit the axle tube mount flange to pass laterally through the aperture, and the first plurality of holes defined by the axle tube mount flange are mis-aligned with the second plurality of holes defined by the axle support bracket and the third plurality of holes defined by the housing of the rear final gear assembly; and
when the axle tube mount flange is positioned laterally between the axle support bracket and the housing of the rear final gear assembly, and is in a second angular orientation, each one of the first plurality of holes is aligned with a respective one of the second plurality of holes and a respective one of the third plurality of holes.

6. The rear axle support assembly of claim 5, further comprising:
a plurality of male fasteners; wherein
each of the first plurality of holes and each of the second plurality of holes comprises a clearance hole;

the housing of the rear final gear assembly comprises a plurality of mount bosses, each of the mount bosses defining a respective one of the third plurality of holes, each of the third plurality of holes being threaded; and each of the male fasteners extends through a respective one of the first plurality of holes and a respective, aligned one of the second plurality of holes, and is threaded into a respective, aligned one of the third plurality of holes.

7. The rear axle support assembly of claim 4, wherein:

the rear final gear assembly comprises a housing;

the first axle tube comprises a laterally inner flange, the laterally inner flange being releasably attached to the housing of the rear final gear assembly;

the second axle tube comprises a tubular portion comprising a laterally inner end, the axle tube mount flange being attached to the laterally inner end of the tubular portion; and the axle tube mount flange is releasably attached to the housing and is positioned laterally between the axle support bracket and the housing and in direct, contacting engagement with the housing.

8. The rear axle support assembly of claim 2, wherein:

the first axle tube of the swing arm assembly is welded to the first support arm of the swing arm assembly.

9. A vehicle comprising:

a frame;

at least one front wheel rotatably coupled with the frame;

at least one rear wheel rotatably coupled with the frame;

a rear axle rotatably coupled with the at least one rear wheel; and a rear axle support assembly coupled with the rear axle, the rear axle support assembly comprising a swing arm assembly pivotally coupled with the frame, the swing arm assembly comprising a first support arm, a second support arm laterally spaced from the first support arm, a first axle tube non-releasably attached to the first support arm, and an axle support bracket attached to the second support arm, the rear axle support assembly further comprising a second axle tube and a rear final gear assembly; wherein the rear axle extends within each of the first axle tube and the second axle tube;

the second axle tube comprises an axle tube mount flange releasably attached to each of the axle support bracket and the rear final gear assembly, the axle tube mount flange being positioned laterally between the axle support bracket and the rear final gear assembly and in direct, contacting engagement with the rear final gear assembly.

10. The vehicle of claim 9, wherein:

the first axle tube of the swing arm assembly is welded to the first support arm of the swing arm assembly.

11. The vehicle of claim 10, wherein:

the axle support bracket defines an aperture comprising a first shape; and the axle tube mount flange comprises a perimeter comprising a second shape, the second shape being complementary with the first shape.

12. The vehicle of claim 11, wherein:

the axle tube mount flange defines a first plurality of holes, the first plurality of holes being arranged in a rectangular pattern; and each of the first plurality of holes is configured to receive a male fastener.

13. The vehicle of claim 12, wherein:

the axle support bracket defines a second plurality of holes;

the rear final gear assembly comprises a housing, the housing defining a third plurality of holes;

when the axle tube mount flange is in a first angular orientation, prior to attachment of the axle tube mount flange to the axle support bracket and the rear final gear assembly, the perimeter of the axle tube mount flange is at least generally aligned with the aperture defined by the axle support bracket, to permit the axle tube mount flange to pass laterally through the aperture, and the first plurality of holes defined by the axle tube mount flange are misaligned with the second plurality of holes defined by the axle support bracket and the third plurality of holes defined by the housing of the rear final gear assembly; and when the axle tube mount flange is positioned laterally between the axle support bracket and the housing, and is in a second angular orientation, each one of the first plurality of holes is aligned with a respective one of the second plurality of holes and a respective one of the third plurality of holes.

14. The vehicle of claim 13, further comprising:

a plurality of male fasteners; further comprising:

each of the first plurality of holes and each of the second plurality of holes comprises a clearance hole;

the housing of the rear final gear assembly comprises a plurality of mount bosses, each of the mount bosses defining a respective one of the third plurality of holes, each of the third plurality of holes being threaded;

each of the male fasteners extends through a respective one of the first plurality of holes and a respective, aligned one of the second plurality of holes, and is threaded into a respective, aligned one of the third plurality of holes.

15. The vehicle of claim 13, wherein:

each of the first plurality of holes, the second plurality of holes, and the third plurality of holes is arranged in a respective rectangular pattern.

16. The vehicle of claim 9, wherein:

the swing arm assembly further comprises a cross-member, the cross-member extending laterally between, and attached to each one of, the first support arm and the second support arm of the swing arm assembly.

17. The vehicle of claim 9, wherein:

the rear final gear assembly comprises a housing; and the axle tube mount flange is releasably attached to the housing and is positioned laterally between the axle support bracket and the housing, and in direct, contacting engagement with the housing.

18. A vehicle comprising:

a frame;

at least one front wheel rotatably coupled with the frame;

at least one rear wheel rotatably coupled with the frame;

a rear axle rotatably coupled with the at least one rear wheel; and a rear axle support assembly, the rear axle support assembly comprising a swing arm assembly pivotally coupled with the frame, the swing arm assembly comprising a first support arm, a second support arm laterally spaced from the first support arm, a first axle tube welded to the first support arm, and an axle support bracket attached to the second support arm, the rear axle support assembly further comprising a second axle tube, and a rear final gear assembly coupled with the rear axle; wherein the rear axle extends within each of the first axle tube and the second axle tube;

the second axle tube comprises an axle tube mount flange and the rear final gear assembly comprises a housing;

the axle tube mount flange is releasably attached to each of the axle support bracket and the housing, the axle tube mount flange being positioned laterally between the axle support bracket and the housing and in direct, contacting engagement with the housing;

the axle support bracket defines an aperture comprising a first shape; and the axle tube mount flange comprises a perimeter comprising a second shape, the second shape being complementary with the first shape.

19. The vehicle of claim 18, wherein:

the axle tube mount flange defines a first plurality of holes arranged in a rectangular pattern;

the axle support bracket defines a second plurality of holes arranged in a rectangular pattern;

the housing of the rear final gear assembly defines a third plurality of holes arranged in a rectangular pattern;

when the axle tube mount flange is in a first angular orientation, prior to attachment of the axle tube mount flange to the axle support bracket and the housing of the rear final gear assembly, the perimeter of the axle tube mount flange is at least generally aligned with the aperture defined by the axle support bracket, to permit the axle tube mount flange to pass laterally through the aperture, and the first plurality of holes defined by the axle tube mount flange are mis-aligned with the second plurality of holes defined by the axle support bracket and the third plurality of holes defined by the housing of the rear final gear assembly; and when the axle tube mount flange is positioned laterally between the axle support bracket and the housing of the rear final gear assembly, and is in a second angular orientation, each one of the first plurality of holes is aligned with a respective one of the second plurality of holes and a respective one of the third plurality of holes.

20. The vehicle of claim 19, further comprising:

a plurality of male fasteners; wherein each of the first plurality of holes and each of the second plurality of holes comprises a clearance hole;

the housing of the rear final gear assembly comprises a plurality of mount bosses, each of the mount bosses defining a respective one of the third plurality of holes, each of the third plurality of holes being threaded; and each of the male fasteners extends through a respective one of the first plurality of holes and a respective, aligned one of the second plurality of holes, and is threaded into a respective, aligned one of the third plurality of holes.

* * * * *